United States Patent
Niu et al.

(10) Patent No.: US 11,851,052 B2
(45) Date of Patent: Dec. 26, 2023

(54) VEHICLE PATH VERIFICATION

(71) Applicant: Ford Global Technologies, LLC, Dearborn, MI (US)

(72) Inventors: Yuming Niu, Northville, MI (US); Md Tawhid Bin Waez, Canton, MI (US); Yousaf Rahman, Ypsilanti, MI (US); Nagarjuna Muvva, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 17/588,489

(22) Filed: Jan. 31, 2022

(65) Prior Publication Data

US 2023/0242104 A1 Aug. 3, 2023

(51) Int. Cl.
*B60W 30/095* (2012.01)
*B60W 40/105* (2012.01)
(Continued)

(52) U.S. Cl.
CPC ........ *B60W 30/095* (2013.01); *B60W 40/105* (2013.01); *B62D 15/021* (2013.01);
(Continued)

(58) Field of Classification Search
CPC ............. B60W 30/095; B60W 40/105; B60W 2554/4049; B60W 2420/42; B62D 15/021; G07C 5/004
(Continued)

(56) References Cited

U.S. PATENT DOCUMENTS

| | | | | |
|---|---|---|---|---|
| 3,742,497 A | * | 6/1973 | Sato | G01S 13/931 342/72 |
| 7,693,627 B2 | * | 4/2010 | Natsume | G01M 17/02 701/1 |

(Continued)

FOREIGN PATENT DOCUMENTS

| | | |
|---|---|---|
| CN | 113156927 A | 7/2021 |
| DE | 102015209217 B3 | 9/2016 |

(Continued)

OTHER PUBLICATIONS

Mcnaughton, M., "Parallel Algorithms for Real-time Motion Planning," The Robotics Institute, Carnegie Mellon University, Jul. 2011, 233 pages.

(Continued)

*Primary Examiner* — Richard A Goldman
(74) *Attorney, Agent, or Firm* — Frank A. MacKenzie; Bejin Bieneman PLC

(57) ABSTRACT

Based on a set of planned control parameters defining a planned path for a vehicle, a set of reference control parameters corresponding to the set of planned path control parameters are identified. Optimized controller inputs associated with the identified set of reference control parameters, the set of planned control parameters, and operation noise data are input to a vehicle dynamics model that outputs a vehicle state model. Based on the vehicle state model, an actual path for the vehicle and an operating range for the actual path are determined. The planned path is determined to be one of verified or unverified based on the operating range.

20 Claims, 7 Drawing Sheets

(51) Int. Cl.
*G07C 5/00* (2006.01)
*B62D 15/02* (2006.01)
(52) U.S. Cl.
CPC ......... *G07C 5/004* (2013.01); *B60W 2420/42* (2013.01); *B60W 2554/4049* (2020.02)
(58) Field of Classification Search
USPC .......................................................... 701/1
See application file for complete search history.

(56) References Cited

U.S. PATENT DOCUMENTS

| | | | |
|---|---|---|---|
| 9,429,443 B2* | 8/2016 | Hoch | B60W 40/107 |
| 9,508,261 B2* | 11/2016 | Rentschler | B62D 15/0265 |
| 9,881,498 B2* | 1/2018 | Paromtchik | B60W 50/12 |
| 10,407,035 B1* | 9/2019 | Gadda | B60W 10/04 |
| 10,800,451 B2* | 10/2020 | Mizoguchi | B62D 6/02 |
| 10,919,536 B2* | 2/2021 | Sim | B60W 50/087 |
| 11,077,845 B2* | 8/2021 | Shalev-Shwartz | B60W 30/0953 |
| 11,099,561 B1* | 8/2021 | Kentley-Klay | G01C 21/32 |
| 11,525,728 B1* | 12/2022 | Petersen | G07C 5/008 |
| 11,541,909 B1* | 1/2023 | Poubel Orenstein | B60W 60/0013 |
| 11,654,938 B1* | 5/2023 | Kumar | B60W 50/14 701/23 |
| 2007/0219720 A1* | 9/2007 | Trepagnier | G01S 17/931 701/300 |
| 2012/0065861 A1* | 3/2012 | Hartmann | B60T 8/17558 701/1 |
| 2015/0127208 A1* | 5/2015 | Jecker | B62D 1/00 701/23 |
| 2015/0310145 A1* | 10/2015 | Nica | G01M 17/007 703/8 |
| 2017/0017236 A1* | 1/2017 | Song | G08G 1/164 |
| 2017/0057410 A1* | 3/2017 | Oh | B60W 30/00 |
| 2018/0260635 A1* | 9/2018 | Al-Dahle | G08G 1/096741 |
| 2019/0291718 A1* | 9/2019 | Nilsson | G05D 1/0088 |
| 2019/0355257 A1* | 11/2019 | Caldwell | G08G 1/0112 |
| 2020/0023516 A1* | 1/2020 | Kato | B25J 9/1664 |
| 2020/0282985 A1* | 9/2020 | Wallin | B60W 30/0956 |
| 2020/0398894 A1* | 12/2020 | Hudecek | G05D 1/0214 |
| 2021/0061270 A1* | 3/2021 | Parks | B60W 10/18 |
| 2021/0114625 A1* | 4/2021 | Liu | B60W 60/0015 |
| 2021/0166572 A1* | 6/2021 | Kim | G06T 13/20 |
| 2021/0188256 A1* | 6/2021 | Hoedt | B60W 50/00 |
| 2021/0253196 A1* | 8/2021 | Yokoyama | B62K 3/002 |
| 2021/0284199 A1* | 9/2021 | Zarringhalam | B60W 50/0097 |
| 2021/0316752 A1* | 10/2021 | Eigel | G08G 1/096791 |
| 2021/0362710 A1* | 11/2021 | Choi | B60W 40/02 |
| 2022/0227367 A1* | 7/2022 | Kario | B60W 30/0956 |
| 2022/0250673 A1* | 8/2022 | Lin | B62D 5/0484 |
| 2022/0324512 A1* | 10/2022 | Heuss | B60W 50/12 |
| 2022/0327719 A1* | 10/2022 | Shaag | G01S 17/931 |
| 2023/0074387 A1* | 3/2023 | Goyal | G01C 21/3407 |
| 2023/0122447 A1* | 4/2023 | Trehan | B62K 3/002 701/22 |
| 2023/0139578 A1* | 5/2023 | Parasuram | B60W 60/00276 701/27 |
| 2023/0140699 A1* | 5/2023 | Bergkvist | G06F 3/013 345/156 |
| 2023/0242104 A1* | 8/2023 | Niu et al. | B62D 15/021 701/1 |

FOREIGN PATENT DOCUMENTS

| | | |
|---|---|---|
| DE | 102017207097 A1 | 10/2018 |
| DE | 102017213353 A1 | 2/2019 |
| WO | 2021151501 A1 | 8/2021 |

OTHER PUBLICATIONS

Kelly, A. et al., "Reactive Nonholonomic Trajectory Generation via Parametric Optimal Control." Robotics Institute Carnegie Mellon University, 2003, 19 pages.

Lee, J, et al., "A unified framework of the automated lane centering/changing control for motion smoothness adaptation," 15th International IEEE Conference on Intelligent Transportation Systems, Anchorage, Alaska, Sep. 2012, 6 pages.

Piazzi, A., et al., "Quintic G2-splines for trajectory planning of autonomous vehicles," Proceedings of the IEEE Intelligent Vehicle Symposium, Oct. 2000, 6 pages.

Connors, J. et al., "Manipulating B-Spline Based Paths for Obstacle Avoidance in Autonomous Ground Vehicles," University of California, Santa Cruz, California, Jan. 2007, 8 pages.

Choi, J., et al., "Path Planning based on B'ezier Curve for Autonomous Ground Vehicles," Computer Engineering Department, University of California Santa Cruz, CA, 2008, 9 pages.

Horst, J., et al., "Trajectory Generation for an On-Road Autonomous Vehicle," The National Institute of Standards and Technology (NIST), Gaithersburg, Maryland, Sep. 2005, 9 pages.

* cited by examiner

VEHICLE PATH VERIFICATION

BACKGROUND

A vehicle can be equipped with electronic and electro-mechanical components, e.g., computing devices, networks, sensors and controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

Figure 1:
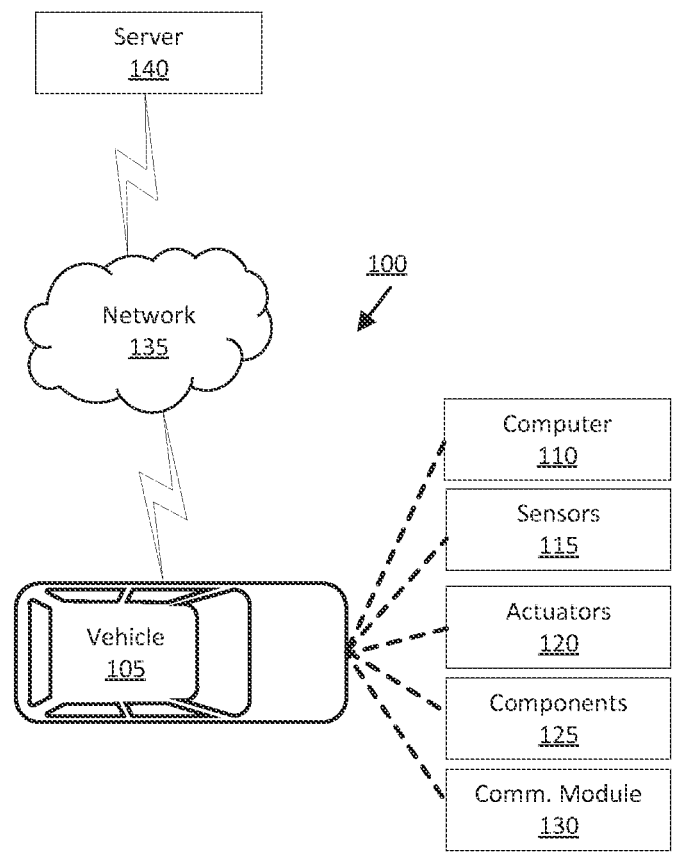
FIG. 1 is a block diagram of an example control system for a vehicle.

A vehicle computer can receive sensor data about an environment around a vehicle and generate a planned path along which to operate the vehicle to avoid objects in the environment. To minimize a deviation between the planned path and an actual path along which the vehicle travels, e.g., due to noisy data, disturbances in a ground surface, etc., the vehicle computer may determine optimized parameters for a controller that minimize a cost function for the deviation by using a vehicle dynamics model.

Advantageously, a remote server computer can determine optimized controller inputs for corresponding sets of reference control parameters using a vehicle dynamics model. The remote server computer can determine a set of planned control parameters defining a planned path for the vehicle and can identify a set of reference control parameters corresponding to the set of planned control parameters. The remote server computer can input the optimized control parameters associated with the identified set of reference control parameters, the set of planned control parameters, and operation noise data to the vehicle dynamics model to determine an actual path for the vehicle and an operating range for the actual path. The remote server computer can determine whether the planned path is verified or unverified based on the operating range. Determining the optimized controller inputs for sets of reference control parameters allows the remote server computer to verify a planned path without having to optimize the controller inputs for a planned path in real-time. That is, upon identifying the set of reference control parameters that corresponds to the set of planned control parameters, the remote server computer can use the determined optimized controller inputs associated with the identified set of reference control parameters to verify the planned path with one iteration of the vehicle dynamics model, which can reduce computational time and resources for verifying the planned path.

A system includes a computer including a processor and a memory, the memory storing instructions executable by the processor to, based on a set of planned control parameters defining a planned path for a vehicle, identify a set of reference control parameters corresponding to the set of planned path control parameters. The instructions further include instructions to input optimized controller inputs associated with the identified set of reference control parameters, the set of planned control parameters, and operation noise data to a vehicle dynamics model that outputs a vehicle state model. The instructions further include instructions to, based on the vehicle state model, determine an actual path for the vehicle and an operating range for the actual path. The instructions further include instructions to determine that the planned path is one of verified or unverified based on the operating range.

The set of planned control parameters can include at least a vehicle speed, a vehicle acceleration, and a steering angle.

The instructions can further include instructions to receive data for an environment around the vehicle. The instructions can further include instructions to determine that the set of planned control parameters is verified based on determining, via the data, no object intersects the operating range. The instructions can further include instructions to receive the data from a vehicle computer in the vehicle.

The instructions can further include instructions to receive data for an environment around the vehicle. The instructions can further include instructions to determine that the set of planned control parameters is unverified based on determining, via the data, an object intersects the operating range. The instructions can further include instructions to receive the data from a vehicle computer in the vehicle.

The instructions can further include instructions to, upon receiving a planned path from the vehicle, determine the set of planned control parameters from the planned path.

The instructions can further include instructions to provide a message to a vehicle computer indicating the planned path is verified or unverified. The system can include the vehicle computer. The vehicle computer can include a second processor and a second memory, the second memory storing instructions executable by the second processor such that the vehicle computer can be programmed to, upon determining the planned path is verified, operate the vehicle along the planned path. The vehicle computer can be further programmed to, upon determining the planned path is unverified, determine an updated planned path. The vehicle computer can be further programmed to, upon generating the planned path, provide the planned path to the computer.

The instructions can further include instructions to query a database to identify the set of reference control parameters. The instructions can further include instructions to determine the controller inputs for the set of reference control parameters by minimizing a cost function for a difference between an expected path and a reference path. The instructions can further include instructions to, upon inputting the set of reference control parameters to the vehicle dynamics model that outputs a reference vehicle state model, determine the reference path based on the reference vehicle state model. The expected path can be defined by the set of reference control parameters.

A method includes, based on a set of planned control parameters defining a planned path for a vehicle, identifying a set of reference control parameters corresponding to the set of planned path control parameters. The method further includes inputting optimized controller inputs associated with the identified set of reference control parameters, the set of planned control parameters, and operation noise data to a vehicle dynamics model that outputs a vehicle state model. The method further includes, based on the vehicle state model, determining an actual path for the vehicle and an operating range for the actual path. The method further includes determining that the planned path is one of verified or unverified based on the operating range.

The set of planned control parameters can include at least a vehicle speed, a vehicle acceleration, and a steering angle.

The method can further include receiving data for an environment around the vehicle. The method can further include determining that the set of planned control parameters is unverified based on determining, via the data, an object intersects the operating range.

The method can further include receiving data for an environment around the vehicle. The method can further include determining that the set of planned control parameters is verified based on determining, via the data, no object intersects the operating range.

The method can further include, upon receiving a planned path from the vehicle, determining the set of planned control parameters from the planned path.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4, an example vehicle control system 100 includes a vehicle 105 and a remote server computer 140. A vehicle computer 110 in the vehicle 105 receives data from sensors 115. The vehicle computer 110 is programmed to operate the vehicle 105 based on verified planned control parameters, as discussed below.

To verify the planned control parameters, the remote server computer 140 is programmed to, based on a set of planned control parameters defining a planned path P for the vehicle 105, identify a set of reference control parameters corresponding to the set of planned path control parameters. The remote server computer 140 is further programmed to input optimized controller inputs associated with the identified set of reference control parameters, the set of planned control parameters, and operation noise data to a vehicle dynamics model that outputs a vehicle state model. The remote server computer 140 is further programmed to, based on the vehicle state model, determine an actual path A for the vehicle and an operating range R for the actual path A. The remote server computer 140 is further programmed to determine that the planned path P is one of verified or unverified based on the operating range R.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140 and/or other vehicles, e.g., via a messaging or broadcast protocol such as Dedicated Short Range Communications (DSRC), cellular, IEEE 802.11, Bluetooth®, Ultra-Wideband (UWB), and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC (application specific integrated circuit) that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g., front view, side view, etc., providing images from an area surrounding the vehicle 105. In the context of this disclosure, an object is a physical, i.e., material, item that has mass and that can be represented by physical phenomena (e.g., light, or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave, and radio frequency) communication mechanisms and any desired network topology (or topologies when a plurality of communication mechanisms are utilized). Exemplary communications provided via the communications module 130 include cellular, Bluetooth®, UWB, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, UWB, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
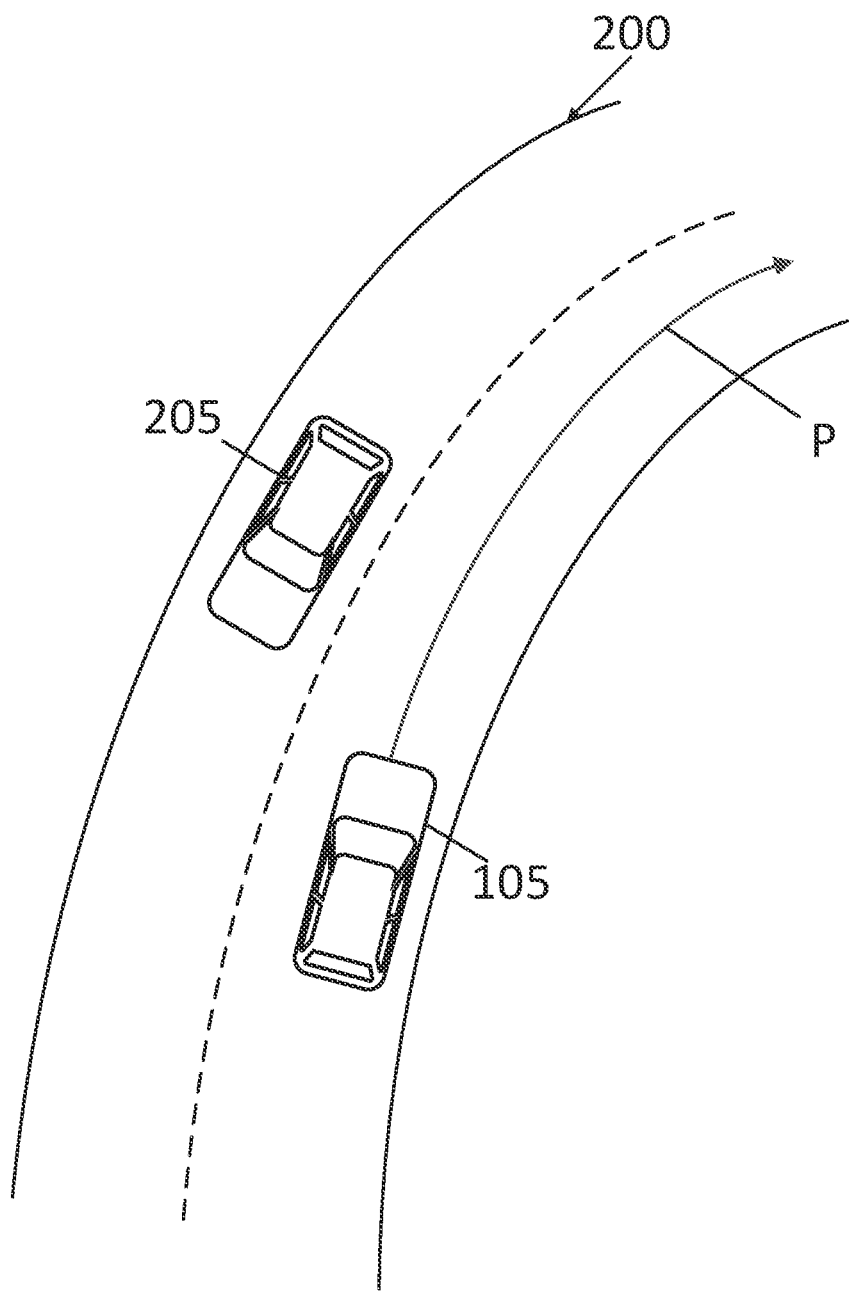
FIG. 2 is a diagram of an example operating area and a planned path for the vehicle.
Figure 3A:
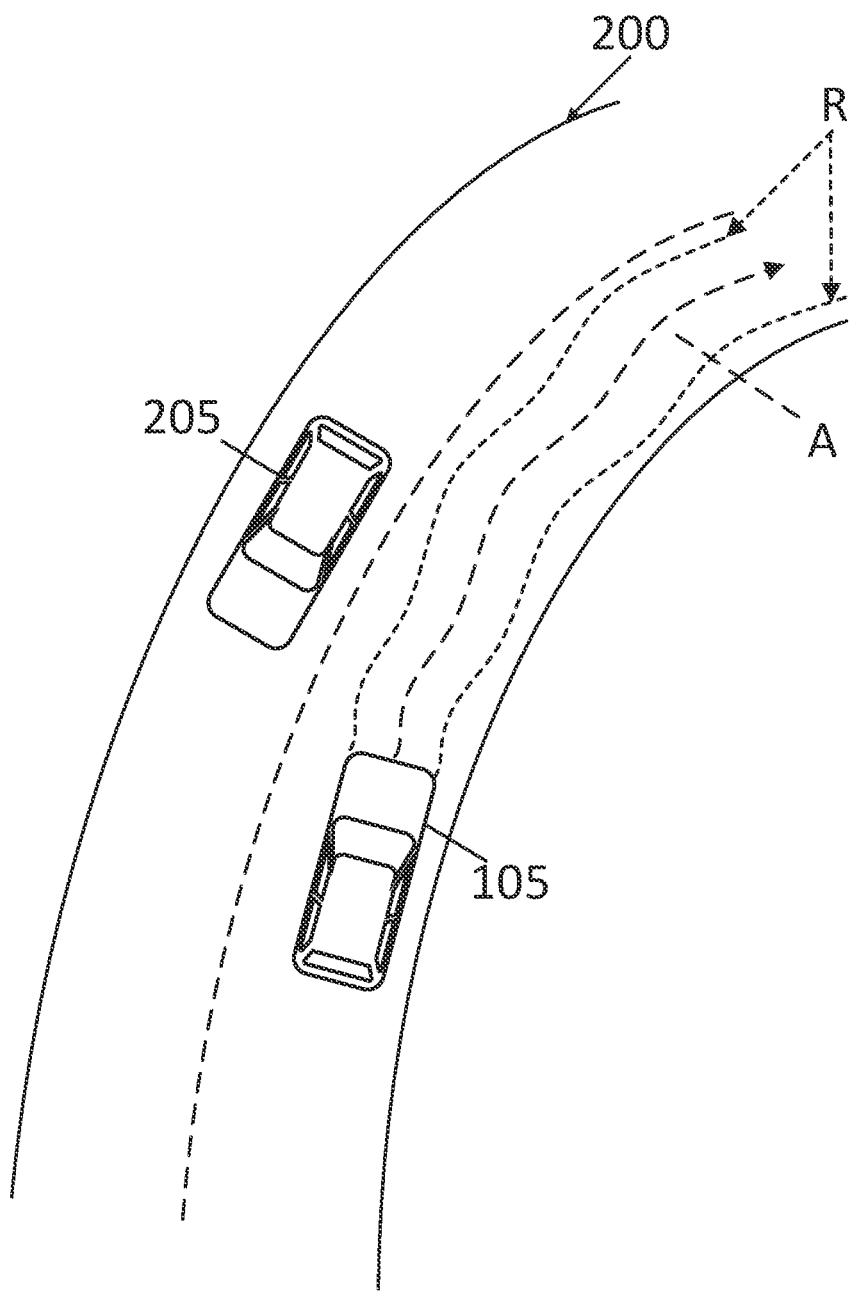
FIGS. 3A-3B are diagrams of example actual paths and operating ranges for the vehicle.
Figure 3B:
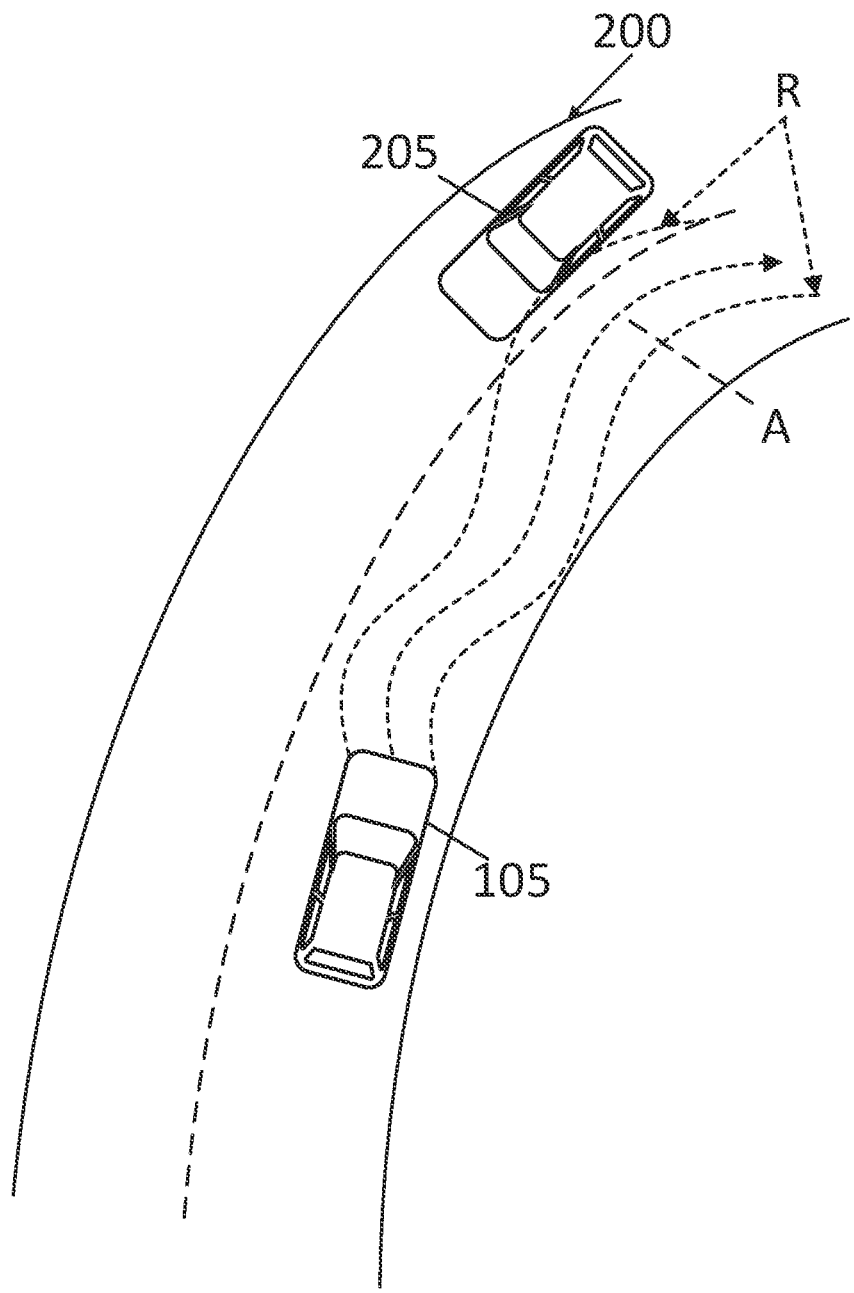

FIG. 2 is a diagram illustrating a vehicle operating in an example operating area 200. An operating area 200 is a specified area of ground surface for operating a vehicle. The operating area 200 may be on a street or road, e.g., an area alongside a curb or an edge of the street, a parking lot or structure or portion thereof, etc.

The vehicle computer 110 can receive sensor 115 data, e.g., image data, of an environment around the vehicle 105. The image data can include one or more objects 205 around the vehicle 105. For example, object classification or identification techniques, can be used, e.g., in the vehicle computer 110 based on LIDAR sensor 115, camera sensor 115, etc., data to identify a type of object 205, e.g., a vehicle, a bicycle, a pole, a pedestrian, etc., as well as physical features of objects 205.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects 205, is provided to a machine learning program for training the classifier. Once trained, the classifier can accept as input vehicle sensor 115 data, e.g., an image, and then provide as output, for each of one or more respective regions of interest in the image, an identification of an object 205 or an indication that no object 205 is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

Upon detecting the object(s) 205 around the vehicle 105, the vehicle computer 110 can determine a pose of an object 205 relative to the vehicle 105 based on sensor 115 data. For example, the vehicle computer 110 can receive image data including the object 205, and the vehicle computer 110 can analyze the image data, e.g., according to known image processing techniques, to determine a pose of the object 205 relative to the vehicle 105. The pose of the object 205 may be specified in six degrees-of-freedom. Six degrees-of-freedom conventionally, and in this document, refers to freedom of movement of an object in three-dimensional space, e.g., translation along three perpendicular axes and rotation about each of the three perpendicular axes. A six degree-of-freedom pose of the object 205 means a location relative to a coordinate system (e.g., a set of coordinates specifying a positing in the coordinate system, e.g., X, Y, and Z coordinates) and an orientation (e.g., a yaw, a pitch, and a roll) about each axis in the coordinate system. The pose of the object 205 can be determined in vehicle coordinates based on orthogonal x, y, and z axes centered at an origin in the vehicle 105 and roll, pitch, and yaw rotations about the x, y, and z axes, respectively. The pose of the object 205 locates the object 205 with respect to the vehicle coordinates.

Additionally, the vehicle computer 110 generates a planned path P to avoid the detected object(s) 205. As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=\alpha_0+\alpha_1 x+\alpha_2 x^2+\alpha_3 x^3 \quad (1)$$

where $\alpha_0$ an offset, i.e., a lateral distance between the path and a center line of the vehicle 105 at the upcoming distance x, $\alpha_1$ is a heading angle of the path, $\alpha_2$ is the curvature of the path, and $\alpha_3$ is the curvature rate of the path.

Upon generating the planned path P, the vehicle computer 110 can provide the planned path and the data about the environment, including the object 205 poses, to the remote server computer 140. For example, the vehicle computer 110 can transmit the planned path and the data to the remote server computer 140, e.g., via the network 135.

The vehicle computer 110 can determine whether the planned path P is verified or unverified based on a message 400 (as discussed below). The vehicle computer 110 can monitor the network 135 to detect the message 400. Upon receiving the message 400, the vehicle computer 110 can access a payload 402, e.g., a specified payload segment 403, of the message 400 and retrieve data specifying whether the planned path P is verified or unverified. If the planned path P is unverified, then the vehicle computer 110 can determine an update planned path P that is different than the planned path P, e.g., according to a known navigation and/or path planning algorithm (as discussed above). If the planned path P is verified, then vehicle computer 110 can operate the vehicle 105 along the planned path P. For example, the vehicle computer 110 can actuate one or more vehicle components 125 to move the vehicle 105 along the planned path P.

Prior to receiving the planned path P, the remote server computer 140 is programmed to associate a plurality of sets of reference control parameters (which can be specified and stored as described below) with corresponding controller inputs using a vehicle dynamics model (as discussed below). As used herein, a "control parameter" is an expected or predicted value of a measurement of a physical characteristic (i.e., a physical quantity) of a vehicle 105 for operating the vehicle 105 along a path. As used herein, "controller inputs" are numerical values representing physical quantities that provide corrections for a control function to minimize a difference between an expected path and an actual path A. That is, the controller inputs allow the vehicle computer 110 to control vehicle operation such that the vehicle 105 substantially satisfies the corresponding set of control parameters. An "expected path" is a path that a vehicle would follow under ideal vehicle operating conditions, e.g., absent operation noise data, absent tire slip, etc. An expected path is represented by a set of control parameters. For example, the planned path P is an expected path represented by the planned control parameters. An "actual path" is a path that a vehicle would follow under actual vehicle operating conditions, e.g., including operation noise data, tire slip, etc. The actual path A is determined based on output from the vehicle dynamics model in response to inputting the set of control parameters representing the expected path to the vehicle dynamics model (as discussed below).

A variety of control parameters may be determined to move the vehicle 105 along a path. As one example, a set of control parameters can include, by way of example and without limitation, a speed of the vehicle 105, an acceleration of the vehicle 105, and a steering angle. A "steering angle" is an angle defined between an axis extending longitudinally through a center of one front wheel of a vehicle 105 and a longitudinal axis of the vehicle 105. That is, the steering angle indicates a direction of travel of the vehicle 105 relative to the longitudinal axis of the vehicle 105. The remote server computer 140 can, for example, maintain a database, a look-up table, etc., that associates the plurality of sets of reference control parameters with corresponding controller inputs. The database can be stored, e.g., in a memory of the remote server computer 140.

To generate the sets of reference control parameters, the remote server computer 140 selects specified reference control parameters. The reference control parameters may be specified by a vehicle and/or component manufacturer, e.g., based on desired parameters for controlling vehicle 105 movement. Additionally, the remote server computer 140 can receive specified values and specified ranges for each of the specified reference control parameters. The specified values and ranges for the respective reference control parameters may be specified by a vehicle and/or component manufacturer, e.g., based on desired vehicle operation and/or sensor resolution. An example specified value for a reference vehicle speed may be, e.g., 0.5 meters per second (m/s), and an example specified range for the reference vehicle speed may be, e.g., 0-50 m/s, inclusive. An example specified value for a reference steering angle may be, e.g., 0.5 degrees, and an example specified range for the reference steering angle may be, e.g., 0-30 degrees, inclusive. An example specified value for a reference acceleration may be, e.g., 0.1 meters per second squared (m/s$^2$), and an example specified range for the reference acceleration may be, e.g., −5 to 3 m/s$^2$, inclusive.

The remote server computer 140 can generate an initial set of reference control parameters by determining that each reference control parameter has a value equal to the minimum value for the respective specified range. The remote server computer 140 can update the database to include the initial set of reference control parameters. The remote server computer 140 can then determine a subsequent set of reference control parameters by incrementing at least one reference control parameter according to the respective specified value. The subsequent set of reference control parameters can then be included in the database. The remote server computer 140 can continue to generate subsequent incremented sets of reference control parameters by iteratively incrementing the reference control parameters by the respective specified values until each reference control parameter has a value equal to the maximum value for the respective specified range. Each set of reference control parameters is determined for a predetermined sampling time, e.g., 1 second.

Upon generating each of the plurality of sets of reference control parameters according to the specified values and ranges for the respective reference control parameters, the remote server computer 140 can select a set of reference control parameters and input the set of reference control parameters and controller inputs to the vehicle dynamics model. In this situation, the controller inputs may be zero-value parameters or some other initial value parameter, e.g., specified by a vehicle and/or component manufacturer. The "vehicle dynamics model" is a model describing dynamics of vehicle 105 motion, in response to a set of control parameters and controller inputs. The "dynamics" of the vehicle 105 refers to a set of physical measurements of the vehicle 105 at a point in time, typically including forces, moments, and velocities of the vehicle 105 resulting from movement of the vehicle 105. The vehicle dynamics model outputs a reference vehicle state model according to a bicycle model:

$$\dot{x} = v\cos(\psi + \beta) \tag{4}$$

$$\dot{y} = v\sin(\psi + \beta) \tag{5}$$

$$\dot{\psi} = \frac{v}{l_r}\sin(\beta) \tag{6}$$

$$\dot{v} = a \tag{7}$$

$$\beta = \tan^{-1}\left(\frac{l_r}{l_r + l_f}\tan(\delta_f)\right) \tag{8}$$

$$\dot{u} = v + V\psi \tag{9}$$

where x and y are coordinates of a center of the state model, e.g., specified in a Cartesian coordinate system, $\Psi$ is an inertial heading, i.e., a yaw angle, v is the vehicle velocity, $l_r$ is a distance from a rear wheel to the center, $l_f$ is a distance from a front wheel to the center, $\beta$ is sideslip angle, i.e., an angle of the vehicle's velocity relative to a longitudinal axis of the vehicle, $\alpha$ is the acceleration of the vehicle, $\delta_f$ is the steering angle, V is velocity of the vehicle along the x-axis of the Cartesian coordinate system, and u is a lateral position of the vehicle. This document uses conventional notation such that a dot above a variable, such as $\dot{u}$, indicates a time rate of change of the corresponding variable, such as u.

The above Equations are combined to determine a linear state space model of the dynamics of the vehicle, e.g., according to known calculation techniques for linearizing the equations at each of a plurality of timesteps having a length of the predetermined sampling time:

$$\dot{X}_L = A_L X_L + B_L \delta \tag{10}$$

$$A_L = \begin{bmatrix} 0 & V & V & 0 \\ 0 & -\frac{C_r + C_f}{mV} & 0 & \frac{C_r l_r - C_f l_f}{mV^2} - 1 \\ 0 & 0 & 0 & 1 \\ 0 & \frac{C_r l_r - C_f l_f}{I_z} & 0 & -\frac{C_r l_r^2 + C_f l_f^2}{I_z V} \end{bmatrix} \tag{11}$$

$$B_L = \begin{bmatrix} 0 \\ \frac{C_f}{mV} \\ 0 \\ \frac{C_f l_f}{I_z} \end{bmatrix} \tag{12}$$

where $X_L = [u\beta\Psi\dot{\Psi}]^T$, i.e., vehicle states, $\dot{X}_L$ is the time rate of change of the vehicle states $X_L$, the T superscript is the transpose matrix operation that inverts columns into rows and rows into columns. As used herein, a "vehicle state" is a parameter of the vehicle 105, e.g., vehicle 105 speed, acceleration, steering angle, lateral offset, yaw rate, yaw acceleration, etc. A "vehicle state model" is a set of values for respective vehicle states, e.g., as determined by the remote server computer 140.

The vehicle dynamics model can model and output dynamics of the vehicle according to the set of reference control parameters and the controller inputs. By inputting the set of reference control parameters and the controller inputs to the vehicle dynamics model, the remote server computer 140 can collect data about dynamics of the vehicle for various sets of reference control parameters and various controller inputs. That is, the remote server computer 140 can test operation of the vehicle with the plurality of sets of reference control parameters and a plurality of controller inputs.

The remote server computer 140 can determine the values for Equation 10 for discrete timesteps k. The state-space representation can be discretized via a zero-order hold transformation to $$\dot{X}_L(k+1) = A_d X_L(k) + B_d \delta(k) \tag{13}$$

where $A_d$, $B_d$ are the discrete versions of $A_L$, $B_L$ with the predetermined sampling time. That is, the remote server computer 140 can determine a reference path of the vehicle 105 by stepping the reference vehicle state model forward by a period of time t subdivided into timesteps k of length of the predetermined sampling time, iteratively determining each successive value k+1 based on the values from the iteration corresponding to k. The zero-order hold transformation converts discrete data into a continuous, piecewise function by holding each data point for the predetermined sampling time.

The remote server computer 140 can then optimize the controller inputs for the given set of reference control parameters. For example, the remote server computer 140 use a linear-quadratic regulator (LQR) algorithm to optimize the controller inputs for the set of reference control parameters. The LQR algorithm is an algorithm that minimizes a cost function for a difference between the expected path, e.g., defined by the set of reference control parameters, and the reference path. The cost function is:

$$J=\int_0^\infty (X^T Q x + u^T R u) dt \quad (14)$$

$$u = -KX \quad (15)$$

Where X is a matrix of $$\begin{bmatrix} x \\ y \\ \psi \\ v \end{bmatrix},$$

J is a quadratic cost function, u is the cost associated with the cost function to be minimized, {Q, R} are the controller inputs. K is determined by:

$$K = R^{-1}(B^T P) \quad (16)$$

where P is found by solving the continuous time algebraic Riccati equation:

$$A^T P + PA - PBR^{-1}B^T P + Q = 0 \quad (17)$$

Upon minimizing the cost function J, the remote server computer 140 can update the database to associate the set of reference control parameters with the controller inputs corresponding to the minimized cost function J. The remote server computer 140 can continue to determine respective controller inputs for subsequent sets of reference control parameters in this manner until each set of reference control parameters is associated with corresponding controller inputs.

Upon receiving the planned path P from the vehicle computer 110, the remote server computer 140 can be programmed to identify a plurality of segments included along the planned path P. For example, the remote server computer 140 can identify a segment along the planned path P based on a curvature of the planned path P. A segment is a portion, i.e., some but less than all, of the planned path P. The segments can be identified based on a change in curvature of the planned path P. That is, a curvature of one segment may be different than a curvature of a previous segment. To identify a segment, the remote server computer 140 can identify a point along the planned path P, e.g., by using the path polynomial for the planned path P, at which a curvature of the planned path P changes, e.g., by more than a threshold amount. The remote server computer 140 can identify the plurality of segments based on successive points. That is, each segment may extend from one point to a successive point.

Each segment can include an identifier, e.g., a numerical value, an alphanumeric string, etc., identifying the respective segment. The remote server computer 140 can generate and assign an identifier to a corresponding segment. For example, the remote server computer 140 can maintain a counter. Upon detecting a segment, i.e., upon detecting a change in curvature of the planned path P, the remote server computer 140 can increment the counter and assign a counter value to the segment.

The remote server computer 140 is programmed to determine a set of planned control parameters for the planned path P, i.e., each segment thereof. The set of planned control parameters includes the same control parameters (i.e., the same measurements, albeit typically with different values) as the sets of reference control parameters. That is, each control parameter in a set of planned control parameters corresponds to respective control parameters in a set of reference control parameters. The remote server computer 140 can determine the set of planned control parameters based on the planned path P. For example, the planned path can include the vehicle motion vector, as discussed above. The remote server computer 140 can retrieve the set of planned control parameters from the vehicle motion vector corresponding to the segment of the planned path P.

Upon determining the set of planned control parameters for one segment of the planned path P, the remote server computer 140 is programmed to identify a set of reference control parameters corresponding to, i.e., substantially matching, the set of planned control parameters. For example, the remote server computer 140 can query the database and compare each set of reference control parameters to the set of planned control parameters. The remote server computer 140 can identify the set of reference control parameters based on minimizing a difference between values in the set of reference control parameters and corresponding values in the set of planned control parameters. For example, the remote server computer 140 can determine respective differences between values in the set of reference control parameters and corresponding values in the set of planned control parameters, e.g., according to known calculation methods such as root-mean-square, sum of squares, etc. The remote server computer 140 can determine a minimal difference, e.g., by comparing the respective differences to each other, and can identify the set of reference control parameters that corresponds to the minimal difference. Upon identifying the set of reference control parameters that corresponds to the minimal difference, the remote server computer 140 can select the controller inputs associated with the identified set of reference control parameters in the database.

Upon selecting the controller inputs, the remote server computer 140 can determine an actual path A for the vehicle 105 and an operating range R for the actual path A based on the set of planned control parameters for, e.g., one segment of, the planned path P. An operating range R specifies lateral boundaries from the actual path A within which vehicle 105 movement may deviate from the actual path A due to operation noise data. The lateral boundaries are paths that are laterally offset from the actual path A in opposite directions from the actual path A. Operation noise data is noise data associated with various sensors 115 and/or actuators 120 that operate to control vehicle 105 movement. Operation noise data can be chosen based on, e.g., a known level of noise of a sensor 115, an actuator 120, and/or an instrument used to physically measure vehicle components 125, e.g., determined from empirical testing, specified by a manufacturer, etc. Operation noise data specifies an upper bound and a lower bound defining a range within which measured data may deviate from actual data.

To determine the actual path A and the operating range R, the remote server computer 140 can input the determined controller inputs, the set of planned control parameters, and operation noise data to the vehicle dynamics model. The vehicle dynamics model can output a vehicle state model according to updated equations for the bicycle model determined by introducing the operation noise data to Equations 4-9:

$$\dot{x} = (v + ⫶v)\cos(\psi + \beta + \Delta_{(\psi+\beta)}) \quad (4)$$

$$\dot{y} = (v + ⫶v)\sin(\psi + \beta + \Delta_{(\psi+\beta)}) \quad (5)$$

$$\dot{\psi} = \frac{(v + ⫶v)}{l_r + \Delta_l}\sin(\beta + \Delta_\beta) \quad (6)$$

$$\beta = \tan^{-1}(\frac{l_r + \Delta_l}{l_r + l_f + \Delta_l}\tan(\delta_f + \Delta_{\delta_f})) \quad (7)$$

$$\dot{v} = a + ⫶a \quad (8)$$

where $\Delta_\beta$ is noise data for the sideslip angle $\beta$, $\Delta_{(\Psi+\beta)}$ is a sum of noise data $\Delta_\beta$ for the sideslip angle $\beta$ and noise data for the inertial heading $\Psi$, $\Delta_{\delta_f}$ noise data for the steering angle $\delta_f$, $\Delta_l$ is a measured distance tolerance between a front axle and a rear axle, ⫶v is noise data for the vehicle velocity v, and ⫶α is noise data for the vehicle acceleration α.

To determine the actual path A, the remote server computer 140 can specify the operation noise data is null. The remote server computer 140 can then determine the actual path A by stepping the vehicle state model forward, as discussed above. To determine the lateral boundaries for the operating range R, the remote server computer 140 can specify the operation noise data is one of the upper or lower bound of the operation noise data. In this situation, the vehicle dynamics model can output an updated vehicle state model, e.g., based on the operation noise. The remote server computer 140 can then determine one lateral boundary for the operating range R by stepping the updated vehicle state model forward, as discussed above. To determine the other lateral boundary for the operating range, the remote server computer 140 can specify the operation noise data is the other of the upper or the lower bound of the operation noise data. The remote server computer 140 can then determine the other lateral boundary for the operating range R by stepping the updated vehicle state model forward, as discussed above. The remote server computer 140 can repeat the above process to determine the actual path A and operating range R for each segment along the planned path P in response to the sets of planned control parameters for the corresponding segments.

The remote server computer 140 determines whether the planned path P, e.g., the segments thereof, is verified or unverified based on the data about the environment around the vehicle 105. For example, the remote server computer 140 can receive the data, including one or more objects 205 around the vehicle 105, from the vehicle computer 110, e.g., via the network 135, as discussed above.

Upon determining the actual path A and the operating range R for the actual path A for each segment, the remote server computer 140 can combine the actual path A and the operating range R for the planned path P, e.g., determined by combining the actual paths A and operating ranges R for successive segments, with the received data, e.g., according to data fusion techniques, i.e., incorporating data from different sensors and/or types of sensors into a common coordinate system of frame of reference. By combining the actual path A and operating range R with the received data, the remote server computer 140 can compare the actual path A and operating range R to the poses of the objects 205 around the vehicle 105. The remote server computer 140 determines that the planned path P is verified based on detecting no object 205 intersects the operating range of the actual path A (see FIG. 3A). The remote server computer 140 determines that the planned path P is unverified based on detecting an object 205 intersecting the operating range R of the actual path A (see FIG. 3B).

Figure 4:
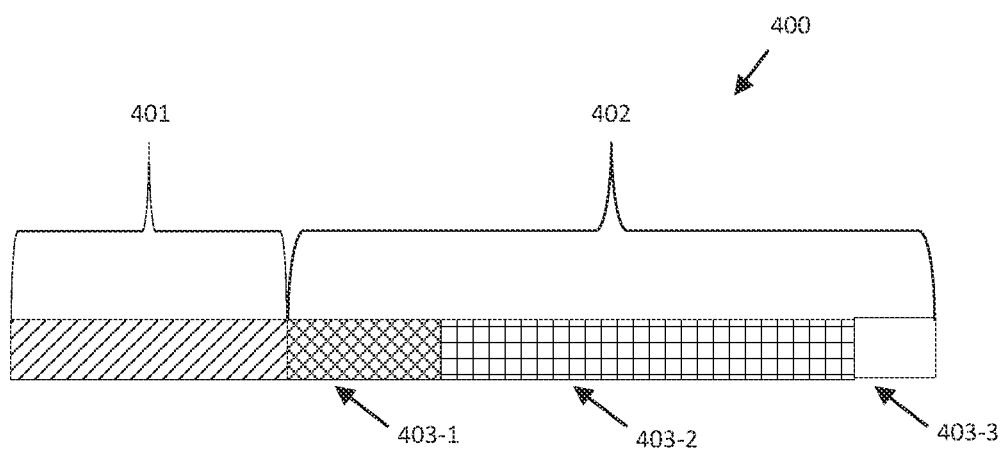
FIG. 4 is a block diagram illustrating an example message.

Upon determining whether the planned path P is verified or unverified, the remote server computer 140 can generate the message 400. The message 400 includes a header 401 and a payload 402 (see FIG. 4). The header 401 of the message 400 may include a message type, a message size, etc. The payload 402 may include various data, i.e., message content. The payload 402 can include sub-payloads or payload segments 403-1, 403-2, 403-3 (collectively, referred to as payload segments 403). The respective payload segments 403 in FIG. 4 are illustrated as being of different lengths to reflect that different payload segments 403 may include various amounts of data, and therefore may be of different sizes, i.e., lengths. The payload 402 of the message 400 includes, e.g., in a specified payload segment 403, data specifying whether the planned path P is verified or unverified.

Upon generating the message 400, the remote server computer 140 can provide the message 400 to the vehicle computer 110. For example, the remote server computer 140 can transmit the message 400 to the vehicle computer 110 via the network 135.

Figure 5:
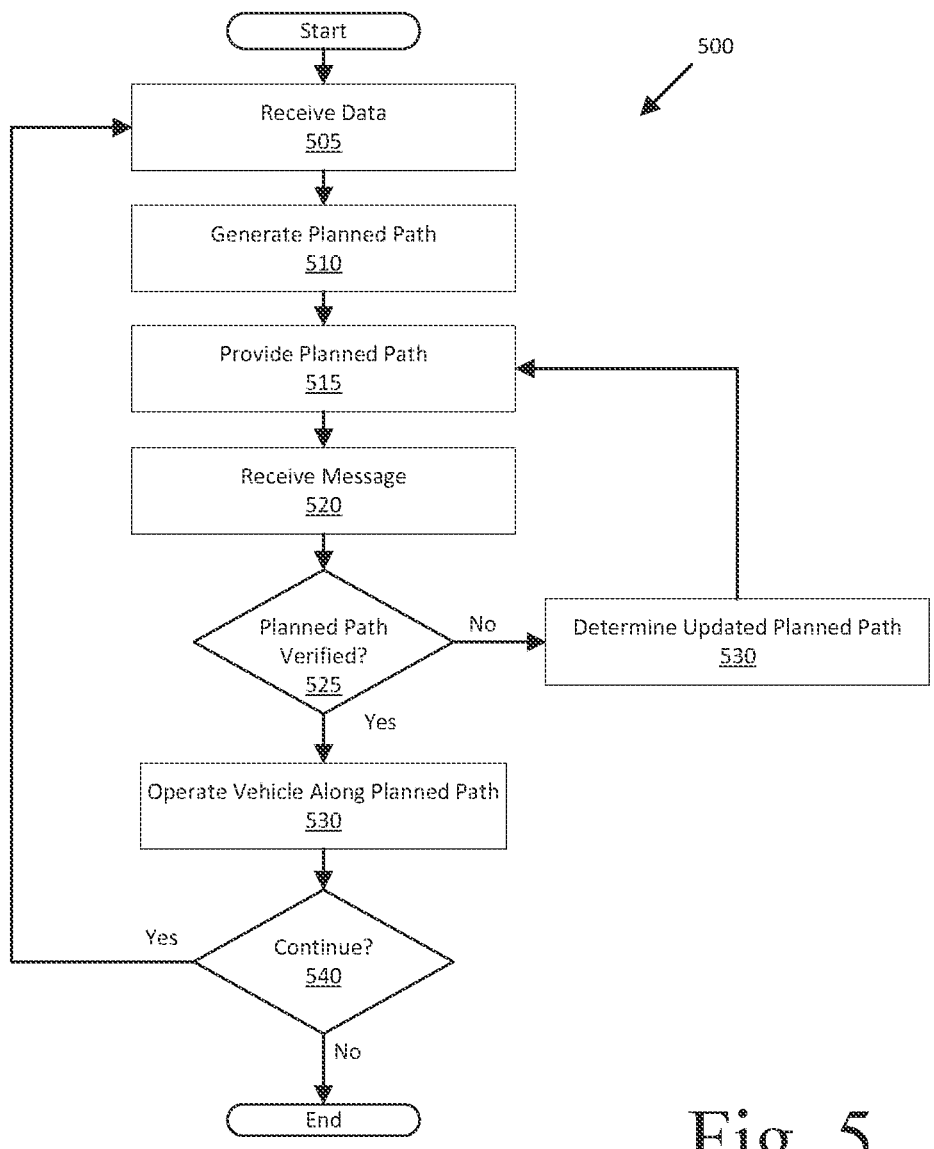
FIG. 5 is a flowchart of an example process for operating, via a vehicle computer, the vehicle along a planned path.

FIG. 5 is a flowchart of an example process 500 executed in a vehicle computer 110 according to program instructions stored in a memory thereof for operating a vehicle 105 along a planned path P. Process 500 includes multiple blocks that can be executed in the illustrated order. Process 500 could alternatively or additionally include fewer blocks or can include the blocks executed in different orders.

Process 500 begins in a block 505. In the block 505, the vehicle computer 110 receives data from one or more sensors 115, e.g., via a vehicle network, from a remote server computer 140, e.g., via a network 135, and/or from a computer in another vehicle, e.g., via V2V communications. For example, the vehicle computer 110 can receive image data, e.g., from one or more image sensors 115, about the operating area 200, e.g., including objects 205 around the vehicle 105, as discussed above. The process 500 continues in a block 510.

In the block 510, the vehicle computer 110 generates a planned path P based on the data received in the block 505, e.g., according to known navigational and/or path planning algorithms, as discussed above. The planned path P can direct the vehicle 105 through the operating area 200 while avoiding the object(s) 205. The process 500 continues in a block 515.

In the block 515, the vehicle computer 110 provides the planned path P (or an updated planned path P) to the remote server computer 140, as discussed above. Additionally, the vehicle computer 110 can provide the data received in the block 505 to the remote server computer 140. The process 500 continues in a block 520.

In the block 520, the vehicle computer 110 receives a message 400 from the remote server computer 140. The process 500 continues in a block 525.

In the block 525, the vehicle computer 110 determines whether the planned path P (or the updated planned path P) is verified or unverified. The vehicle computer 110 can access a payload 402 and retrieve data specifying the planned path P (or the updated planned path P) is verified or unverified, as discussed above. If the vehicle computer 110 determines that the planned path P (or the updated planned path P) is verified, then the process 500 continues in a block 535. Otherwise, the process 500 continues in a block 530.

In the block 530, the vehicle computer 110 generates the updated planned path P that is different from the planned path P, e.g., according to known navigational and/or path planning algorithms, as discussed above. The process 500 returns to the block 515.

In the block 535, the vehicle computer 110 operates the vehicle 105 along the planned path P (or the updated planned path P). That is, the vehicle computer 110 can actuate one or more vehicle components 125 to move the vehicle 105 along the planned path P (or the updated planned path P). The process 500 continues in a block 540.

In the block 540, the vehicle computer 110 determines whether to continue the process 500. For example, the vehicle computer 110 can determine to continue upon determining that the vehicle 105 is powered on. In another example, the vehicle computer 110 can determine not to continue when the vehicle 105 is powered off. If the vehicle computer 110 determines to continue, the process 500 returns to the block 505. Otherwise, the process 500 ends.

Figure 6:
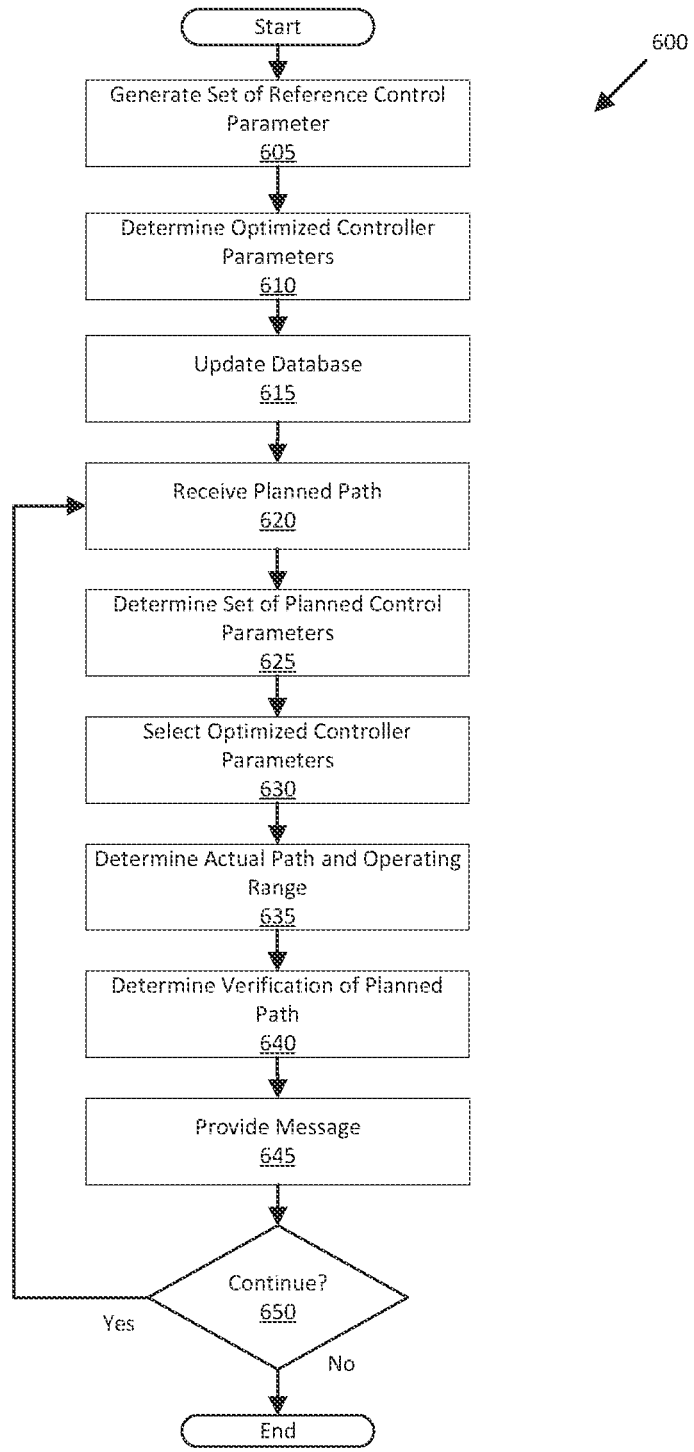
FIG. 6 is flowchart of an example process for verifying, via a remote server computer, the planned path for the vehicle.

FIG. 6 is a flowchart of an example process 600 executed in a remote server computer 140 according to program instructions stored in a memory thereof for verifying a planned path P for a vehicle 105. Process 600 includes multiple blocks that can be executed in the illustrated order. Process 600 could alternatively or additionally include fewer blocks or can include the blocks executed in different orders.

Process 600 begins in a block 605. In the block 605, the remote server computer 140 generates a plurality of sets of reference control parameters, as discussed above. The process 600 continues in a block 610.

In the block 610, the remote server computer 140 determines optimized controller inputs for each set of reference control parameters. The remote server computer 140 can input a set of reference control parameters into a vehicle dynamics model, as discussed above. The remote server computer 140 can then use an LQR algorithm to optimize controller inputs to minimize a cost function for a difference between an expected path, e.g., defined by the set of reference control parameters, and an actual path, e.g., determined based on a vehicle state model, as discussed above. The process 600 continues in a block 615.

In the block 615, the remote server computer 140 updates a database to associate each of the plurality of sets of reference control parameters with the corresponding optimized controller inputs. The process 600 continues in a block 620.

In the block 620, the remote server computer 140 receives a planned path P from a vehicle computer 110. Additionally, the remote server computer 140 can receive data about an environment around a vehicle 105, including one or more objects 205, as discussed above. The process 600 continues in a block 625.

In the block 625, the remote server computer 140 determines a set of planned control parameters based on the planned path P, as discussed above. The remote server computer 140 can identify a plurality of segments of the planned path P, e.g., based on a curvature of the planned path P, as discussed above. In this situation, the remote server computer 140 can determine a set of planned control parameters for each segment of the planned path P. The process 600 continues in a block 630.

In the block 630, the remote server computer 140 selects optimized controller inputs for a set of planned control parameters. The remote server computer 140 can query the database to identify a set of reference control parameters that corresponds to the set of planned control parameters, e.g., by minimizing differences between values in the set of planned control parameters and corresponding values in the set of reference control parameters, as discussed above. The remote server computer 140 can then select the optimized controller inputs associated with the identified set of reference control parameters. The process 600 continues in a block 635.

In the block 635, the remote server computer 140 determines an actual path A and an operating range R for the actual path A. The remote server computer 140 inputs the selected optimized controller inputs, the set of planned control parameters, and operation noise data into the vehicle dynamics model, as discussed above. The remote server computer 140 can determine the actual path A and the operating range R from the vehicle state model output by the vehicle dynamics model, as discussed above. The process 600 continues in a block 640.

In the block 640, the remote server computer 140 determines a verification of the planned path P based on the operating range R of the actual path A. The verification is one of verified or unverified. The remote server computer 140 can compare the operating range R of the actual path A to poses of objects 205 in the environment around the vehicle 105, e.g., by combining the actual path A, the operating range R, and the received data according to data fusion techniques, as discussed above. If an object 205 intersects the operating range R, then the remote server computer 140 determines that the planned path P is unverified. If an object 205 does not intersect the operating range R, then the remote server computer 140 determines that the planned path P is verified. The process 600 continues in a block 645.

In the block 645, the remote server computer 140 generates a message 400 including data specifying the planned path P is verified or unverified, as discussed above. The remote server computer 140 can then provide the message 400 to the vehicle computer 110, as discussed above. The process 600 continues in a block 650.

In the block 650, the remote server computer 140 determines whether to continue the process 600. For example, the remote server computer 140 can determine to continue upon determining that the vehicle 105 is powered on, e.g., based on receiving continued communications from the vehicle computer 110. In another example, the remote server computer 140 can determine not to continue upon determining that the vehicle 105 is powered off, e.g., based on failing to receive communications from the vehicle computer 110. If the remote server computer 140 determines to continue, the process 600 returns to the block 620. Otherwise, the process 600 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor programmed to:
    based on a set of planned control parameters defining a planned path for a vehicle, identify a set of reference control parameters corresponding to the set of planned path control parameters;
    input optimized controller inputs associated with the identified set of reference control parameters, the set of planned control parameters, and operation noise data to a vehicle dynamics model that outputs a vehicle state model;
    based on the vehicle state model, determine an actual path for the vehicle and an operating range for the actual path; and
    determine that the planned path is one of verified or unverified based on the operating range.

2. The system of claim 1, wherein the set of planned control parameters includes at least a vehicle speed, a vehicle acceleration, and a steering angle.

3. The system of claim 1, wherein the instructions further include instructions to:
    receive data for an environment around the vehicle; and
    determine that the set of planned control parameters is verified based on determining, via the data, no object intersects the operating range.

4. The system of claim 3, wherein the instructions further include instructions to receive the data from a vehicle computer in the vehicle.

5. The system of claim 1, wherein the instructions further include instructions to:
receive data for an environment around the vehicle; and
determine that the set of planned control parameters is unverified based on determining, via the data, an object intersects the operating range.

6. The system of claim 5, wherein the instructions further include instructions to receive the data from a vehicle computer in the vehicle.

7. The system of claim 1, wherein the instructions further include instructions to, upon receiving a planned path from the vehicle, determine the set of planned control parameters from the planned path.

8. The system of claim 1, wherein the instructions further include instructions to provide a message to a vehicle computer indicating the planned path is verified or unverified.

9. The system of claim 8, further comprising the vehicle computer, the vehicle computer including a second processor and a second memory, the second memory storing instructions executable by the second processor such that the vehicle computer is programmed to, upon determining the planned path is verified, operate the vehicle along the planned path.

10. The system of claim 9, wherein the vehicle computer is further programmed to, upon determining the planned path is unverified, determine an updated planned path.

11. The system of claim 9, wherein the vehicle computer is further programmed to, upon generating the planned path, provide the planned path to the computer.

12. The system of claim 1, wherein the instructions further include instructions to query a database to identify the set of reference control parameters.

13. The system of claim 12, wherein the instructions further include instructions to determine the controller inputs for the set of reference control parameters by minimizing a cost function for a difference between an expected path and a reference path.

14. The system of claim 13, wherein the instructions further include instructions to, upon inputting the set of reference control parameters to the vehicle dynamics model that outputs a reference vehicle state model, determine the reference path based on the reference vehicle state model.

15. The system of claim 13, wherein the expected path is defined by the set of reference control parameters.

16. A method, comprising:
based on a set of planned control parameters defining a planned path for a vehicle, identifying a set of reference control parameters corresponding to the set of planned path control parameters;
inputting optimized controller inputs associated with the identified set of reference control parameters, the set of planned control parameters, and operation noise data to a vehicle dynamics model that outputs a vehicle state model;
based on the vehicle state model, determining an actual path for the vehicle and an operating range for the actual path; and
determining that the planned path is one of verified or unverified based on the operating range.

17. The method of claim 16, wherein the set of planned control parameters includes at least a vehicle speed, a vehicle acceleration, and a steering angle.

18. The method of claim 16, further comprising:
receiving data for an environment around the vehicle; and
determining that the set of planned control parameters is unverified based on determining, via the data, an object intersects the operating range.

19. The method of claim 16, further comprising:
receiving data for an environment around the vehicle; and
determining that the set of planned control parameters is verified based on determining, via the data, no object intersects the operating range.

20. The method of claim 16, further comprising, upon receiving a planned path from the vehicle, determining the set of planned control parameters from the planned path.

* * * * *